United States Patent [19]

Gaiser

[11] Patent Number: 4,606,583
[45] Date of Patent: Aug. 19, 1986

[54] BRAKE SYSTEM
[75] Inventor: Robert F. Gaiser, Stevensville, Mich.
[73] Assignee: Allied Corporation, Morristown, N.J.
[21] Appl. No.: 647,495
[22] Filed: Sep. 5, 1984
[51] Int. Cl.[4] .............................................. B60T 8/22
[52] U.S. Cl. .................................. 303/6 C; 303/24 F
[58] Field of Search ............ 188/195; 303/6 C, 22 R, 303/24 R, 24 F

[56] References Cited

U.S. PATENT DOCUMENTS 3,233,947 2/1966 Oberthur .................... 303/6 C X
3,695,733 10/1972 Alderton .
3,977,735 8/1976 Bush et al. ...................... 188/195 X Primary Examiner—Duane A. Reger
Attorney, Agent, or Firm—Larry J. Palguta; Ken C. Decker

[57] ABSTRACT

A brake system for a vehicle includes a proportioning valve assembly in cooperation with a control rod. The control rod extends between an axle and a body to limit movement therebetween during braking. The control rod is loaded during braking and the load applied thereto is selectively transmitted to the proportioning valve assembly.

19 Claims, 4 Drawing Figures

BRAKE SYSTEM

The present invention relates to a brake system wherein fluid pressure from a master cylinder is communicated to a brake assembly via a proportioning valve or the like. The proportioning valve reduces fluid pressure communicated to the brake assembly to minimize skidding condition for a wheel assembly associated with the brake assembly.

In U.S. Pat. No. 3,362,758 a proportioning valve is disposed in the fluid conduit between a master cylinder and a rear brake assembly. The proportioning valve is connected with a lever so that the operation of the proportioning valve can be altered in response to the weight carried by a vehicle as determined by the height between a body and an axle. Obviously, with a fully loaded vehicle the chances for a skidding condition are less likely than with an empty vehicle. Consequently, the lever is coupled to the vehicle body to sense the height changes of the body as a function of the weight carried by the vehicle. With a fully loaded vehicle, the operation of the proportioning valve is delayed to provide for greater breaking by the rear wheel assembly. The height of the vehicle body is an approximation of the braking effectiveness of the rear wheel assembly because vehicle body bounce and rear wheel tire patterns can also affect the rear wheel braking effectiveness regardless of the weight carried by the vehicle. Consequently, it is desireable to provide a proportioning valve assembly which is directly related to the braking load generated by the rear wheel assembly.

The present invention comprises a brake system for a vehicle having a wheel assembly supported by an axle which is coupled to a vehicle body by suitable means, the wheel assembly including a brake assembly which is operable during braking to retard rotation of the wheel assembly, a proportioning valve or the like fluidly communicating with the brake assembly to selectively reduce the communication of fluid pressure thereto during braking, and a control rod extending between the axle and the body to limit movement of the axle relative to the body during braking, characterized in that said proportioning valve or the like is carried by said control rod and said axle cooperates with said proportioning valve or the like to define a rest position therefore.

It is an advantage of the present invention that the load cooperating with the proportioning valve is directly related to the braking load generated by the wheel assembly causing the axle to move relative to the vehicle body.

Figure 1:
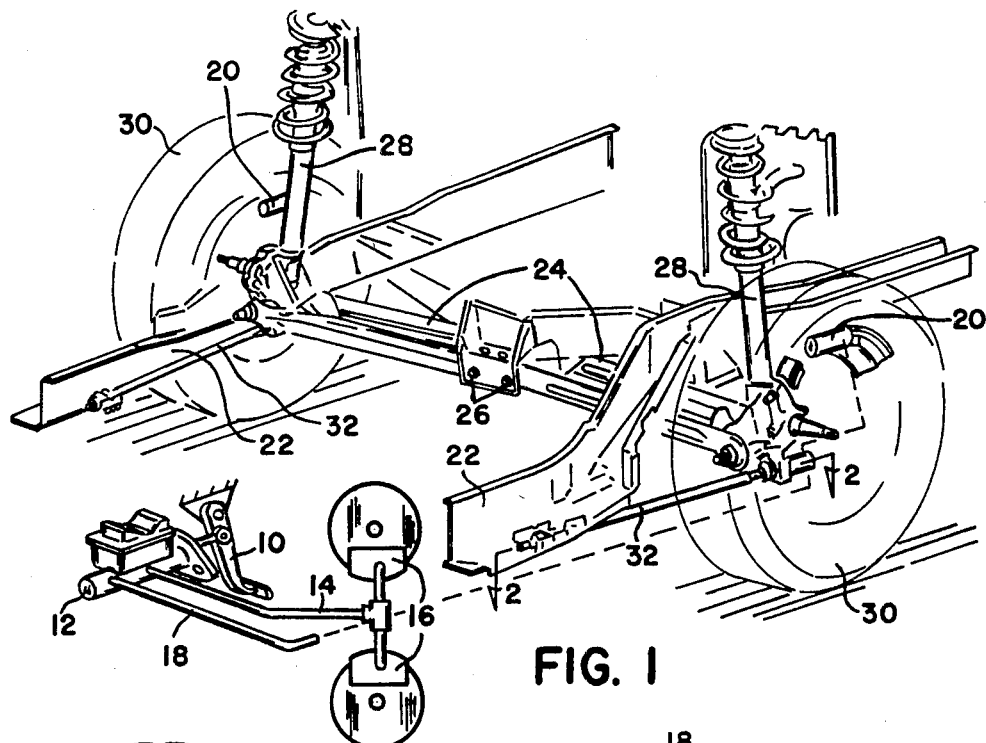
FIG. 1 is a schematic illustration of a brake system for a vehicle.

The brake system of FIG. 1 includes a vehicle brake pedal 10 coupled to a master cylinder 12 to generate fluid pressure therein during braking. A first conduit 14 communicates fluid pressure to a pair of front brake assemblies 16 while a second conduit 18 communicates fluid pressure to a pair of rear brake assemblies 20. The vehicle includes a body 22 with several frame members coupled together. An axle 24 is connected to the body via a pivotal mounting 26 and a pair of struts 28. The axle supports wheel assemblies 30 associated with the rear brake assemblies 20 in a conventional manner, and a pair of control rods 32 extend between the axle 24 and the body 22 to limit movement therebetween in a forward and a rearward direction.

Figure 2:
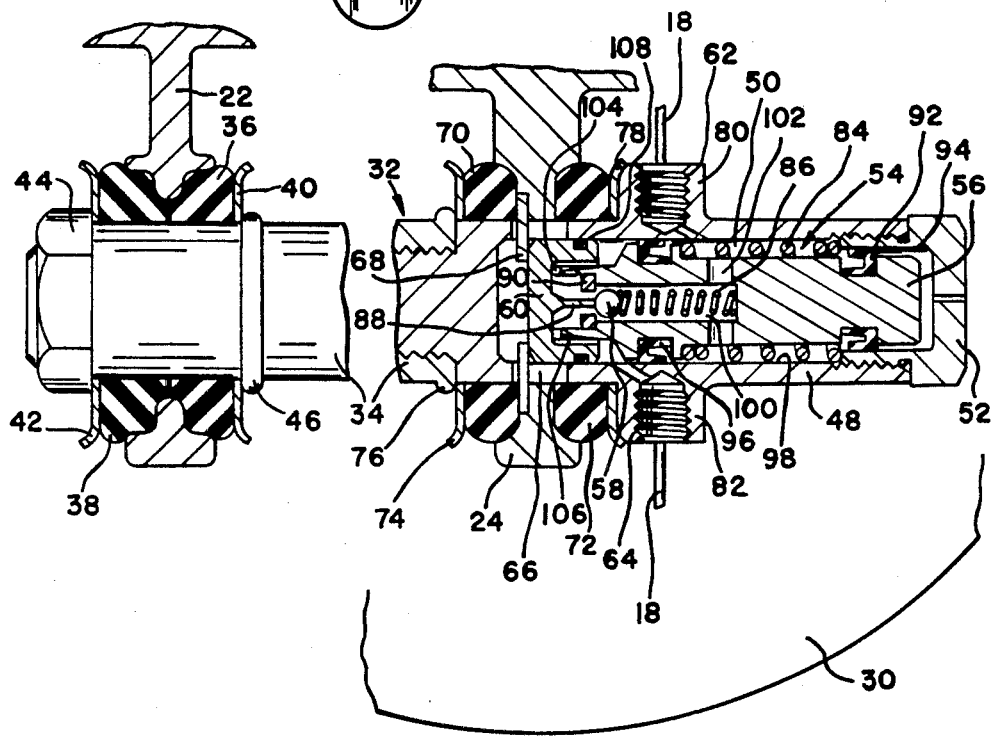
FIG. 2 is a cross-sectional view taken along line 2—2 of FIG. 1.

In FIG. 2 the control rod 32 comprises a first part 34 coupled to the body 22 via a pair of resilient members 36 and 38. A pair of washers 40 and 42 are trapped between a nut 44 threaded to the end of the first part 34 and a ridge 46 formed on the first part 34. The control rod 32 also comprises a second part 48 threadably coupled to the first part 34. The second part 48 defines a cavity 50 extending from the first part 34 to a plug 52 at the rear of the control rod 32. The cavity receives the proportioning valve assembly 54 comprising a piston 56, a valve member 58 and a poppet 60. The second part 48 forms an inlet 62 and an outlet 64 fluidly intersecting the conduit 18 so that fluid pressure communicated to the rear brake assembly 20 will communicate through the cavity 50 via and the proportioning valve assembly 54. The second part 48 defines openings 66 leading to the cavity 50 so that a projection 68 in the form of a C-ring extends into the cavity to define a rest position for the poppet 60. The projection 68 abuts the axle 24 which is coupled to the control rod via a pair of resilient members 70 and 72. A washer 74 abuts a ridge 76 on the first part 34 to trap resilient member 70 and projection 68 while a washer 78 abuts bosses 80 and 82 forming inlet 62 and outlet 64, respectively, to trap resilient member 72 against the axle 24. A first spring 84 biases the piston 56 against the poppet 60 in a rest position and a second spring 86 biases the valve member 58 against a stem 88 formed by the poppet 60 to remain spaced from a seat 90 carried by the piston 56.

The piston 56 carries a first seal 92 engaging an inner surface 94 of plug 52 and a second seal 96 engaging the inner surface 98 of cavity 50. The valve member 58 is disposed in a pocket 100 with apertures 101 communicating the pocket 100 with the cavity 50 and the inlet 62. The end of the piston 56 adjacent the poppet 60 is provided with slots 104 and channels 106 to provide fluid communication paths from the pocket 100 to the outlet 64 when the valve member 58 is spaced from the seat 90. The poppet 60 carries a seal 108 to retain fluid on one side of the poppet 60 where the piston 56 is located.

Figure 3:
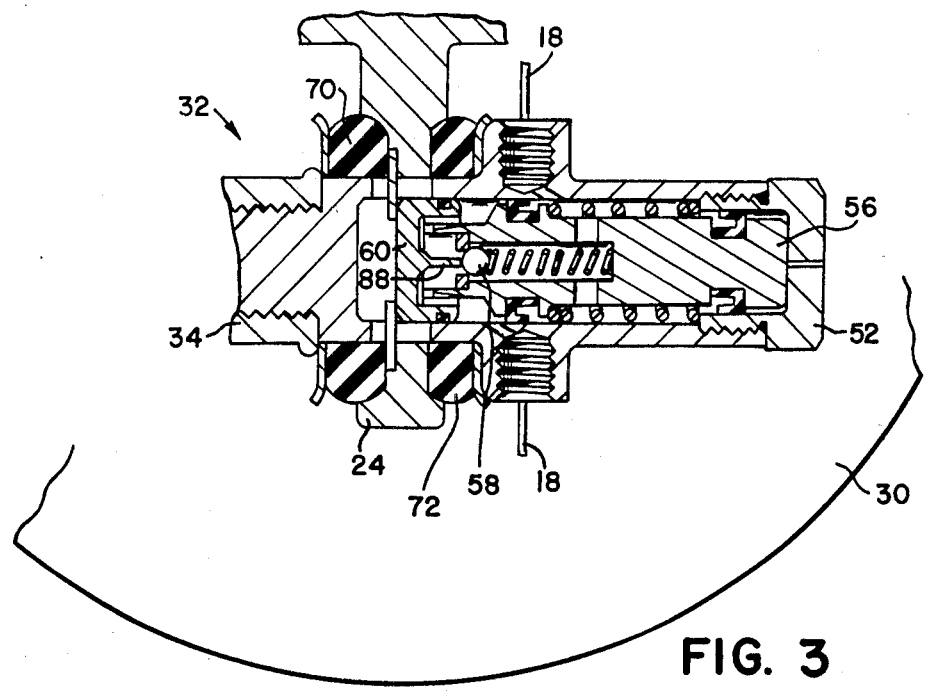
FIG. 3 is a view of the proportioning valve in FIG. 2 in a brake applied position.
Figure 4:
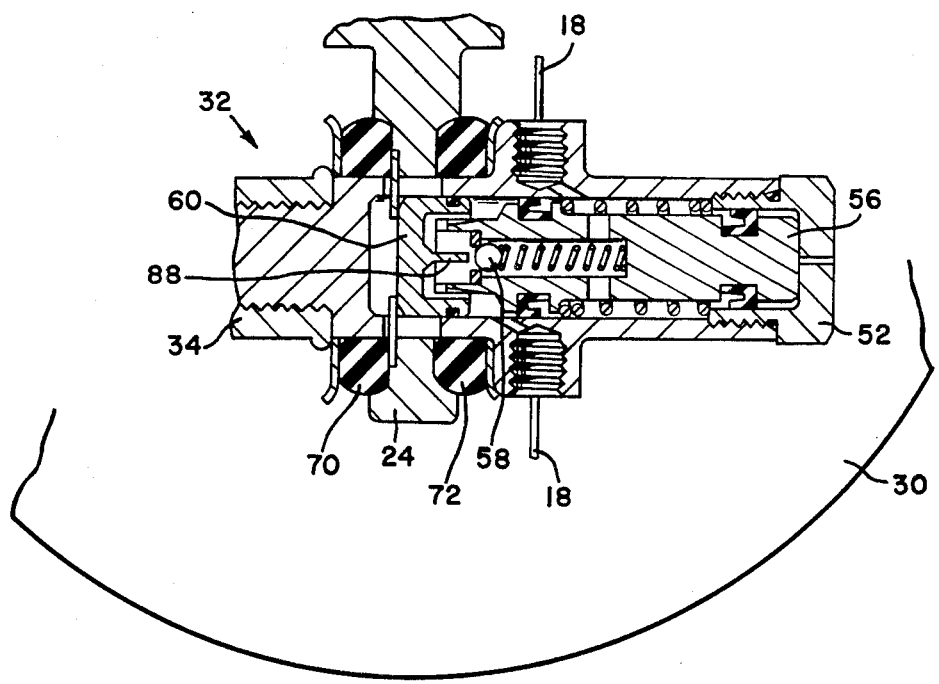
FIG. 4 is a view of the proportioning valve in FIG. 2 in a brake applied position when the rear wheel assembly initially skids relative to a road surface under the vehicle.

During a brake application fluid pressure is communicated from the master cylinder 12 to the front brake assemblies 16 via conduit 14 and to the rear brake assemblies 20 via conduit 18 and control rod 32 for actuation of the proportioning valve assembly 54. Fluid pressure in the control rod 32 communicates through inlet 62, cavity 50, aperture 102, pocket 100, seat 90, slot 104, channel 106 and outlet 64. With fluid pressure acting against the piston 56 across the large diameter for seal 96 and across the small diameter for seal 92, a resulting fluid pressure force biases the piston 56 to move toward plug 52 and contract spring 84. At a predetermined fluid pressure level the piston 56 moves to abut the plug 52, as shown in FIGS. 3 and 4, and bring seat 90 into engagement with valve member 58. At the same time the rear wheel assemblies are being braked to retard rotation thereof so that the body 22 wants to continue moving forward while the axle 24 wants to stop. As a result the control rod is loaded in tension and the control rod moves slightly in the forward direction in direct relation to the tension load imparted to the control rod, so that the resilient member 72 is compressed between the axle 24 and the washer 78 while the resilient member 70 is expanded between the washer 74 and the axle 24. The slight movement of the control rod is transmitted to the piston 56 when the latter abuts the plug so that the piston 56 is moved relative to the axle 24 and the projection 68 to reengage the valve member 58 with the stem and permit further increases in fluid pressure communicated to the rear brake assemblies. If too much fluid pressure is communicated to the rear brake assemblies, the rear wheels will lock up and skid on the surface supporting the vehicle. However, at the same time the rear wheels initiate a skid, the tension on the control rod is decreased because the friction of a skidding wheel is less than the friction of a rotating wheel being braked. With a decrease in the tension imparted to the control rod 32, the wheel assembly and axle 24 move slightly toward the body 22 in FIG. 2 so that the resilient member 72 is expanded and the resilient member 70 is compressed as shown in FIG. 4. Movement of the projection 68 with the axle 24 relative to the control rod 32 permits the poppet to also move toward the body to fully engage valve member 58 with seat 90 and expand the volume of fluid trapped downstream of the valve member 58, thereby decreasing the fluid pressure in communication with the rear wheel assemblies and reducing the likelihood of further skidding for the rear wheel assemblies. As the axle 24 continues its oscillation relative to the control rod 32, the fluid pressure in communication with the rear wheel assemblies will be reduced whenever a skidding condition is initiated. Upon termination of braking the piston returns to the rest position shown.

Although not shown, both control rods 32 are provided with proportioning valve assemblies which are identical to that described hereinabove.

Although the foregoing description proceeds with reference to a tension control rod, it is also possible to provide a proportioning valve assembly in a compression control rod that would extend rearwardly from the axle 24 to another portion of the body 22.

I claim:

1. A brake system for a vehicle having a wheel assembly supported by an axle coupled to a vehicle body by suitable means, the wheel assembly including a brake assembly operable during braking to retard rotation of the wheel assembly, proportioning valve means directly responsive to wheel braking torque and fluidly communicating with the brake assembly to selectively reduce communication of fluid pressure thereto during braking, and a control rod extending between the axle and the body to limit movement of the axle relative to the body during braking and transmit wheel braking torque in conjunction with the axle, the proportioning valve means carried by said control rod and the axle cooperating with the proportioning valve means to substantially define a rest position therefor, the control rod defining a cavity receiving a piston, the piston cooperating with a poppet fixedly disposed relative to said axle in order to control fluid communication through said cavity and control rod, the axle including a projection extending into said cavity to position the poppet, and wheel braking torque transmitted by the axle to the control rod and proportioning valve means affecting said communication of fluid pressure.

2. The brake system of claim 1, in which said control rod comprises a first part connected to said body and a second part connected to said axle, and said first part and proportioning valve means carried by said second part.

3. The brake system of claim 1, in which said proportioning valve means is carried by said control rod at an end thereof adjacent said axle.

4. The brake system of claim 1, in which said axle cooperates with said proportioning valve means via a resilient member.

5. The brake system of claim 4, in which said resilient member extends between said axle and said control rod.

6. The brake system of claim 1, in which said control rod extends from said axle in a forward direction to connect with said body and the control rod extends rearwardly from said axle to carry the proportioning valve means rearwardly of said axle.

7. A brake system for a vehicle having a wheel assembly supported by an axle coupled to a vehicle body by suitable means, the wheel assembly including a brake assembly operable during braking to retard rotation of the wheel assembly, proportioning valve means fluidly communicating with the brake assembly to selectively reduce communication of fluid pressure thereto during braking, and a control rod extending between the axle and the body to limit movement of the axle relative to the body during braking, characterized in that said proportioning valve means is carried by said control rod and the axle cooperates with the proportioning valve means to substantially define a rest position therefor, said control rod defining a cavity receiving a piston and a poppet which cooperate to define a fluid path through said control rod, and said axle including a projection extending into said cavity to oppose said poppet.

8. The brake system of claim 7, in which said control rod includes outwardly extending bosses defining an inlet port and an outlet port leading to said cavity, and said outwardly extending bosses oppose movement of said axle away from said body.

9. The brake system of claim 7, in which said control rod comprises a first part connected to said body and a second part connected to said axle, and said first part and proportioning valve means carried by said second part.

10. The brake system of claim 7, in which said proportioning valve means is carried by said control rod at an end thereof adjacent said axle.

11. The brake system of claim 7, in which said axle cooperates with said proportioning valve means via a resilient member.

12. The brake system of claim 11, in which said resilient member extends between said axle and said control rod.

13. The brake system of claim 7, in which said control rod extends from said axle in a forward direction to connect with said body and said control rod extends rearwardly from the axle to carry said proportioning valve means rearwardly of said axle.

14. The brake system of claim 7, in which said control rod is loaded during braking as a function of the resistance to movement imparted to a surface by said wheel assembly and the control rod load is directly imparted to said proportioning valve means above a predetermined value.

15. The brake system of claim 7, in which said control rod is loaded during braking to move relative to said axle, and the movement of said control rod is transmitted to said proportioning valve means to alter the characteristics thereof during braking.

16. The brake system of claim 15, in which the load imparted to said control rod is altered during a skidding condition for said wheel assembly and said control rod is responsive to said skidding condition to reposition said proportioning valve means in order to reduce the fluid pressure communicated to said brake assembly.

17. A brake system for a vehicle having a wheel assembly supported by an axle coupled to a vehicle body by suitable means, the wheel assembly including a brake assembly operable during braking to retard rotation of the wheel assembly, proportioning valve means fluidly communicating with the brake assembly to selectively reduce communication of fluid pressure thereto during braking, and a control rod extending between the axle and the body to limit movement of the axle relative to the body during braking, characterized in that said proportioning valve means is carried by said control rod and the axle cooperates with the proportioning valve means to substantially define a rest position therefor, said control rod defining a cavity receiving a piston, said piston cooperating with a poppet fixedly disposed relative to said axle in order to control fluid communication through said cavity, and the control rod defining an end wall normally spaced from said piston and said piston engageable with said end wall when said poppet is engageable with said piston to reduce fluid communication outwardly from said cavity.

18. The brake system of claim 17, in which said axle cooperates with said proportioning valve means via a resilient member.

19. The brake system of claim 17, in which said control rod extends from said axle in a forward direction to connect with said body and said control rod extends rearwardly from said axle to carry said proportioning valve means rearwardly of said axle.

* * * * *